423-328 SR
6/2/87 OR H 000,282

United States Statutory Invention Registration [19]

[11] Reg. Number: H282
[43] Published: Jun. 2, 1987

Edwards et al.

[54] HIGH SILICA/ALUMINA RATIO FAUJASITE TYPE NAY

[75] Inventors: Grant C. Edwards, Silver Spring, Md.; Robert L. Chiang, Anaheim, Calif.

[73] Assignee: W. R. Grace & Co., New York, N.Y.

[21] Appl. No.: 710,518

[22] Filed: Mar. 11, 1985

Related U.S. Application Data

[63] Continuation of Ser. No. 453,604, Dec. 27, 1982, abandoned.

[51] Int. Cl.[4] ..... C01B 33/28; C03C 3/66
[52] U.S. Cl. ..... 423/328; 423/329; 502/79
[58] Field of Search ..... 423/328, 329; 502/79

[56] References Cited

U.S. PATENT DOCUMENTS

| | | | |
|---|---|---|---|
| 3,130,007 | 4/1964 | Breck . | |
| 3,506,400 | 4/1970 | Eberly et al. | 423/328 |
| 3,574,538 | 4/1971 | McDaniel et al. . | |
| 3,639,099 | 2/1972 | Elliott et al. . | |
| 3,671,191 | 6/1972 | Maher et al. . | |
| 3,808,326 | 4/1974 | McDaniel et al. . | |
| 3,912,619 | 10/1975 | Magee et al. . | |
| 3,957,689 | 5/1976 | Ostermaier et al. . | |
| 4,016,246 | 4/1977 | Whittam . | |
| 4,164,551 | 8/1979 | Elliott, Jr. . | |
| 4,178,352 | 12/1979 | Vaughan et al. . | |

FOREIGN PATENT DOCUMENTS

| | | |
|---|---|---|
| 967136 | 5/1975 | Canada . |
| 0101316 | 2/1984 | European Pat. Off. . |
| 1041453 | 9/1966 | United Kingdom . |
| 1044983 | 10/1966 | United Kingdom . |
| 1050476 | 12/1966 | United Kingdom . |
| 1431944 | 4/1976 | United Kingdom . |
| 1450119 | 9/1976 | United Kingdom . |

OTHER PUBLICATIONS

Hartmut Kacirek and Hans Lechert, "Investigations on the Growth of the Zeolite Type NaY" 1975, The Journal of Physical Chemistry vol. 79, No. 15, pp. 1589–1593.

(List continued on next page.)

*Primary Examiner*—John F. Terapane
*Assistant Examiner*—Eric Jorgensen
*Attorney, Agent, or Firm*—Edward J. Cabic

[57] ABSTRACT

A sodium Y type faujasite having a high silica/alumina ratio is obtained by lowering the active soda content below the conventionally employed levels. This is done by adding an acid and/or an aluminum salt solution such as an aluminum sulfate solution to the sodium silicate in the zeolite synthesis slurry. Alternatively, the desired alumina and silica starting materials can be supplied in part by using an aluminum salt gelled mother liquor such as an alum gelled mother liquor. This permits the use of less reactants which are high in soda such as sodium silicate and sodium aluminate which in turn reduces the amount of soda present. The addition of these soda removers or the use of low soda reactants permits the production of NaY having a silica/alumina ratio of 5.0 and higher. These Y zeolites have a high degree of crystallinity as measured by an NMR sharpness index defined herein and they have an absence of occluded silica. The final product can be ion exchanged to a low level of $Na_2O$ with rare earth or other metal cations or ammonium ions, to make a more thermally and steam stable zeolitic promoter for catalysts for treating petroleum fractions than can be made from conventional sodium Y.

24 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Comparison of High Silica Alumina Ratio Na-Y
With Prior Art

LEGEND

Prior art slurries which yield NaY having a 5.0 $SiO_2$: 1.0 $Al_2O_3$ ratio. ——— 5.0

Slurries of present application which yield HSAY having a 5.8 $SiO_2$: 1.0 $Al_2O_3$ ratio. o-o-o 5.8

OTHER PUBLICATIONS

Hartmut Kacirek and Hans Lechert, "Rates of Crystallization and a Model for the Growth of NaY Zeolites" 1976, The Journal of Physical Chemistry, vol. 80, No. 12, pp. 1291-1296.

S. Ramadas et al., "Ordering of Aluminum and Silicon in Synthetic Faujasites", Nature, vol. 292, Jul. 16, 1981, pp. 228-230.

Klinowski et al., "A Re-examination of Si, Al Ordering in Zeolites NaX and NaY", J. Chem. Soc., Faraday Trans. 2, 78, pp. 1025-1050 (1982).

E. Dempsey et al., "Variation of the Lattice Parameter with Aluminum Content in Synthetic Sodium Faujasites. Evidence for Ordering of the Framework Ions", J. Phys. Chem., vol. 73, No. 2, Feb. 1959, pp. 387-390.

Comparison of High Silica Alumina Ratio Na-Y
With Prior Art

LEGEND

Prior art slurries which yield NaY having a 5.0 $SiO_2$: 1.0 $Al_2O_3$ ratio. 5.0

Slurries of present application which yield HSAY having a 5.8 $SiO_2$: 1.0 $Al_2O_3$ ratio. 5.8

NMR MAS Spectra of HSAY And Commercial NaY

HSAY and Prior Art NaY Cell Size vs Silica/Alumina Ratio

HIGH SILICA/ALUMINA RATIO FAUJASITE TYPE NAY

This is a continuation, of application Ser. No. 453,604, filed Dec. 27, 1982, now abandoned.

FIELD OF THE INVENTION

This invention relates to the production of a Y-type zeolite having a high silica to alumina ratio and to the resulting unique zeolite obtained.

DESCRIPTION OF THE PREVIOUSLY PUBLISHED ART

The Breck U.S. Pat. No. 3,130,007 is the basic patent on Zeolite Y and it defines the zeolite in terms of moles of oxides as $$0.9\pm0.2\ Na_2O:\ Al_2O_3:\ w\ SiO_2:\ x\ H_2O$$

where w is a value greater than 3 up to about 6 and x may be a value of up to about 9. The disclosed use for Zeolite Y is as an adsorbent.

Breck discusses two types of silica sources. When the major source of silica is a lower cost silica source such as sodium silicate, silica gel or silicic acid, the zeolite Y composition prepared usually has silica/alumina ($SiO_2$-/$Al_2O_3$) molar ratios ranging from greater than 3 up to about 3.9. Examples are given in Tables III and IV. The lowest amount of soda used is in Range 5. By multiplying the lowest ratio of $Na_2O$ to $Al_2O_3$ (which is 0.6) by the lowest $SiO_2/Al_2O_3$ ratio of 8, the lowest possible $Na_2O$ content is 4.8 moles which is above line A in FIG. 1 to be discussed below.

When it is desired to have zeolite Y product compositions having silica/alumina molar ratios above about 3.9, then Breck employs as the preferable major source of silica more expensive silica sources such as aqueous colloidal silica sols and the reactive amorphous solid silicas. Since these colloidal silica sols and reactive amorphous solid silicas are expensive materials as compared to sodium silicate, Breck does not provide any teaching as to how to make high silica Y zeolite from lower cost reactants.

Breck also requires a first digestion at ambient or room temperature. The criticality of this cold aging for all the production processes is shown in Table V.

The Esso Great Britain Pat. No. 1,044,983 discloses making type Y zeolites having a silica to alumina ratio of 3 to 7 in which the reactants have low ratios of soda to silica and water to silica. Like the Breck patent, the preferred silica source and the material used in all of the examples which are claimed to yield 5.5-6.8 $SiO_2/Al_2O_3$ ratio in a well-crystallized NaY form is a silica sol which is an expensive material.

The McDaniel et al U.S. Pat. No. 3,808,326 discloses the use or seeds or nucleation cen having an average size below about 0.1 micron to produce Type Y zeolites. In Example II the zeolite particles are stated to possess a silica to alumina ratio of about 5.0 to 6.0, but no individual values are listed. The $SiO_2$ to $Al_2O_3$ ratios vary from 9.5 to 14.5 and the amount of $Na_2O$ added is listed with the amount in each case being greater than the amount em in the present invention.

The Maher et al U.S. Pat. No. 3,671,191 discloses the preparation of high silica synthetic faujasite by using seeds and a silica to alumina reactant ratio of about 16:1. At this preferred 16:1 silica to alumina synthesis ratio the $Na_2O$ to alumina ratio shown in the Example is 6.6.

This is identified as point G in the figure. Among the products produced is one having a ratio of 5.2 in Example 2 and 5.4 in Example 3.

The Elliott et al. U.S. Pat. No. 3,639,099 discloses producing a faujasite having a silica to alumina ratio greater than 4 by using seeds. The improvement in this patent was to use a lower ratio of silica to alumina. A range of 8-12 $SiO_2$ to 1 $Al_2O_3$ is disclosed with a preferred silica to alumina ratio in the reaction slurry of about 9:1. In that case the preferred reactant mixture has $3.5\pm0.4$ $Na_2O$ for each $Al_2O_3$. The lowest level at a 9.1 silica to alumina ratio would be 3.1 moles of $Na_2O$. This point is identified as point F on the figure. Among the products made from a 10 to 1 ratio in Table 1 the lowest free $Na_2O$ used was 3.5 and it produced a zeolite with a $SiO_2/Al_2O_3$ rario of only 5.47.

The Whittam et al. U.S. Pat. No. 4,016,246 discloses the preparation of zeolite Y having a silica to alumina molar ratio of greater than 3 up to about 6.2. The method requires the use of an "active" sodium metasilicate hydrate which is distinguishable from conventional sodium metasilicates. This unique hydrate is produced by three methods described in the patent. Since this starting raw material is difficult to obtain because it requires special manufacturing techniques, it would appear that Whittam's method is also expensive to carry out.

The Vaughan et al. U.S. Pat. No. 4,178,352 discloses a synthesis of Type Y zeolite using a minimum of excess reactants. There is a generic statement that the resulting zeolites can have a silica to alumina ratio of from about 4 to 5.5. However, the highest product ratio shown in the examp is in Example 6 at a ratio of 5.1. The final reactant mixtures have for each mole of $Al_2O_3$ from 4 to 7.5 moles of $SiO_2$ and from 1.2 to 3 $Na_2O$. Most of the examples use reactant solutions where the silica to alumina ratio is 6 to 1 with 1.8 or 1.9 moles of $Na_2O$. Point E in the Figure represents this technique where the silica to alumina mole ratio is 6 and there is 1.8 moles of $Na_2O$ for one mole of alumina.

The McDaniel U.S. Pat. No. 3,574,538 discloses using kaolin and in the preferred embodiment metakaolin and sodium silicate in the form of waterglass to prepare faujasite materials having a silica to alumina ratio in excess of 4.5 from inexpensive raw materials. In the examples, products are made with the highest silica to alumina ratios of 5.90 and 5.95. However, in industrial practice it is difficult to obtain kaolin and/or metakaolin that meet the desired chemical and physical properties which optimize this process.

The Wilson Great Britain Pat. No. 1,431,944 discloses making a crystalline alumino-silicate zeolite having a silica-to-alumina mole ratio in the range of 5.5 to 8.0. The method requires a series of sequential steps for addition of the reactants. First, a faujasite precursor solution is formed and heated. Then, a sodium silicate solution is added to increase the $SiO_2/Al_2O_3$ molar ratio. Next, as a critical step, an aqueous aluminum chloride solution is added to form a gel slurry. Additional steps require heating, removing the gel from the slurry and adding further water to the gel with further heating to promote crystallization. The Wilson method does not relate to a synthesis procedure in which all of the reactants are essentially mixed together at the same time.

OBJECTS OF THE INVENTION

It is an object of this invention to produce a Y type zeolite having a high silica to alumina ratio of greater than 5.0.

It is a further object to produce a Y type zeolite having a high silica to alumina ratio, a high degree of crystallinity and an absence of occluded silica.

It is a further object of this invention to obtain a high silica Y type zeolite that is made from a source of alumina other than metakaolin or kaolin.

It is a further object of this invention to obtain a high silica Y type zeolite which can be used for catalytic purposes by employing inexpensive silica sources such as sodium silicate, silica gel or silicic acid.

It is a further object to lower the active soda content in the reaction mixture to obtain a high silica Y type zeolite.

It is a further object to use an alum gelled mother liquor from a previous synthesis as a starting material when lowering the active soda content to make a high silica Y zeolite.

These and other objects will become apparent as the description of the invention proceeds.

SUMMARY OF THE INVENTION

High silica/alumina sodium Y type faujasite, HSAY, is produced by carefully controlling the active soda content to a level below the conventionally employed amounts. The Y type faujasite is made from a source of alumina other than metakaolin or kaolin while the source of silica is an inexpensive source such as sodium silicate, silica gel, silicic acid or mixtures thereof. The soda content can be reduced by one of two different techniques or a combination of the two. The first involves adding a controller of active soda such as an acid and/or an aluminum salt solution obtained from aluminum and an acid which reduces the amount of active sodium in the zeolite synthesis slurry. Preferred materials are a dilute acid or a dilute aluminum sulfate solution. The other technique involves using as a starting reactant a combination source of reactive silica and alumina which is low in active soda. This can be used in conjunction with the individual source of silica and source of alumina discussed above. A preferred combination source is a previous mother liquor which has been treated with an aluminum salt to obtain an aluminum salt gelled mother liquor which is low in soda. A preferred aluminum salt for this embodiment is aluminum sulfate which is also known as alum.

By lowering the soda level, it is possible to produce unique, well crystallized NaY zeolites with a silca/alumina ratio of 5.0 and higher and especially at levels of 5.8 and higher. These unique high silica/alumina products can also be ion-exchanged with rare earth or ammonium cations to even lower levels of $Na_2O$ to produce a more thermally and steam stable zeolitic promoter for petroleum cracking catalysts, petroleum hydrocracking catalysts, etc.

The Y type faujasites made by this process have a high degree of crystallinity. When these materials are studied by magic angle spinning nuclear magnetic resonance (m.a.s.n.m.r.) as discussed more fully infra, the peaks for the Si[1Al] and Si [0Al] are sharper than comparable commercial samples. By expressing the sharpness relative to the Si[2Al] peak and multiplying by ten, a sharpness index, S.I., is obtained. The S.I. for the Si[1Al] peak is at least 6 and preferably at least 7 while the S.I. for the Si[0Al] peak is at least about 2.2 and preferably at least 2.5.

DESCRIPTION OF THE PREFERRED EMBODIMENTS

Figure 1:
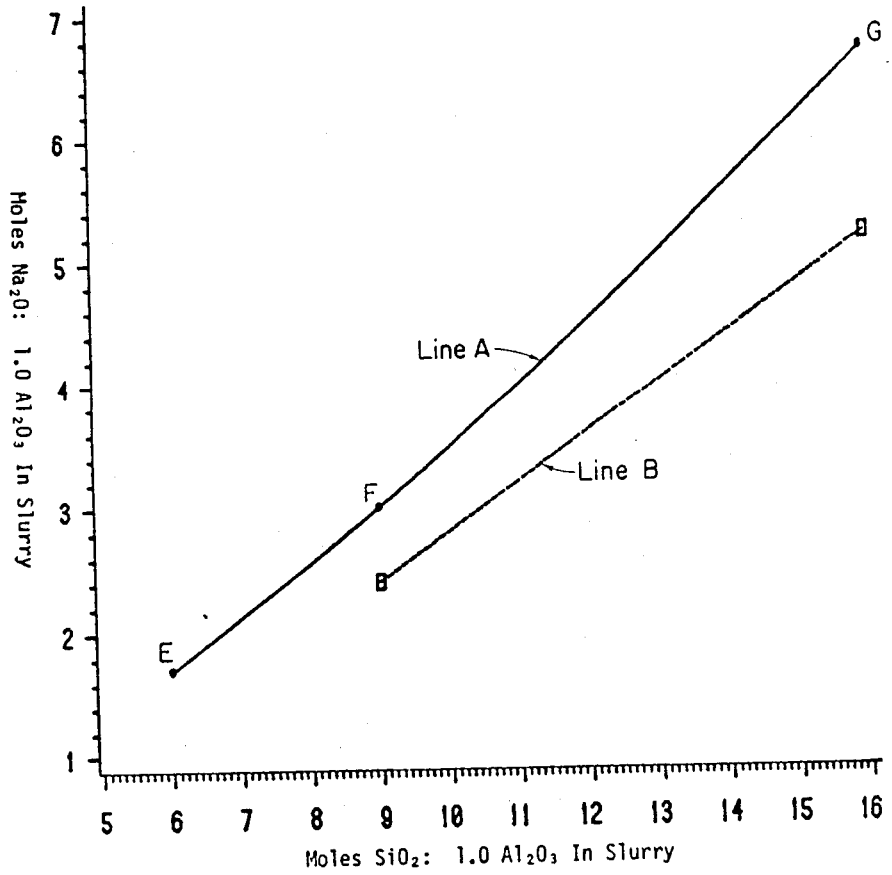
FIG. 1 is a graph of slurry compositions for producing Y faujasite products in terms of ratios of $Na_2O$ and $SiO_2$ to $Al_2O_3$.

The high silica/alumina sodium Y faujasites are made from sources of alumina, silica, soda, seeds or nucleation centers, and a further reactant which permits a reduced active soda concentration to be present in the reaction mixture.

The more preferred sources of the alumina can be either alumina trihydrate, alumina monohydrate, a sodium aluminate solution, or an aluminum sulfate (alum) solution. Other possible alumina sources could be alumina gel, aluminum hydroxide, aluminum chloride, aluminum nitrate or other salts of aluminum and acids. It is particularly desired not to use kaolin or metakaolin because in industrial practice it is difficult to obtain these two materials in a form that meets the desired chemical and physical properties which optimize this process.

The preferred silica sources are inexpensive sources such as sodium silicate, silica gel, silicic acid or mixtures of these materials. It is particularly desired for industrial application not to use the more expensive sources of silica such as aqueous colloidal silica sols or the more expensive forms of reactive amorphous solid silicas. Another possible silica source is an alum gelled mother liquor to be discussed more below.

The preferred source of soda is obtained from the sodium salt form of the compounds used to supply the silica and alumina, namely sodium silicate and sodium aluminate. Other possible soda sources are sodium hydroxide and sodium carbonate although it must be remembered that the goal of this invention is to reduce the amount of soda in the reaction mixture.

Seeds or nucleation centers can be the conventional Y zeolite seed material or the mother liquor from the production of zeolites A, X or Y or alum gelled mother liquors. One preferred method of making the seeds is set forth in the McDaniel et al. U.S. Pat. No. 3,808,326 and is described in Example 1 below.

The further reactant which permits a reduced active soda concentration to be present in the reaction mixture can be added in one of two forms or a combination of the two. In the first form the material is considered a controller of active soda since it will react with the excess active soda to bind it up so that it does not adversely affect the synthesis of the high silica Y zeolite. Examples of materials which control this active soda concentration are acids, salts obtained from reacting aluminum with an acid, and mixtures of these two materials. The acid is preferably added in the dilute form and a preferred acid is sulfuric acid. In the preferred embodiment these added controllers of active soda are added at the time of mixing of the slurry or they are added within about 3 hours of the time that the slurry has been heated to the most effective results.

The other form of the further reactant is to provide a combination source of reactive silica and alumina which is low in active soda. This can be done by adding an aluminum salt to the silica containing mother liquor from a previous production to precipitate a silica/alumina hydrogel which is low in active soda. Examples of aluminum salts include aluminum sulfate, aluminum chloride, aluminum nitrate or mixtures thereof. Aluminum sulfate (alum) is the preferred salt. A preferred example of this recycle technique is disclosed in the Elliott U.S. Pat. No. 4,164,551 where alum, which is aluminum sulfate, is added to the filtered mother liquor to precipitate a silica/alumina hydrogel. This hydrogel is referred to as AGML or alum gelled mother liquor and it or other aluminum salt gelled mother liquors can be used directly as a starting material when making the high silica faujasite according to the present invention.

According to this invention, the active soda content is to be reduced below the conventionally employed levels. Referring to FIG. 1, line A illustrates the conventional formulations that produce a NaY faujasite havin 5.0 $SiO_2$ to $Al_2O_3$ ratio. For a reaction slurry at point G with 16 moles of $SiO_2$ for every mole of $Al_2O_3$ it has been traditional to have the $Na_2O$: $Al_2O_3$ ratio at about 6.6. For a reaction slurry at point F with 9 moles of $SiO_2$ for each mole of $Al_2O_3$, the $Na_2O$: $Al_2O_3$ ratio has its lowest value at about 3.1 while for a reaction slurry at point E with 6 moles of $SiO_2$ for each mole of $Al_2O_3$, the $Na_2O$: $Al_2O_3$ ratio is about 1.7. Thus line A is based on at least the following points for ratios in the synthesis slurry

| $SiO_2$:$Al_2O_3$ Ratio | $Na_2O$:$Al_2O_3$ Ratio |
|---|---|
| 16:1 | 6.6:1 |
| 9:1 | 3.1:1 |
| 6:1 | 1.8:1 |

According to the present invention the soda levels are reduced to levels below line A by the addition of a controller of active soda such as an acid and/or a salt of aluminum and an acid. This salt can be added as a solution. The preferred forms of the acid or salt are dilute solutions and a preferred form of the salt is a dilute aluminum sulfate (alum) solution. In the more preferred embodiments the active soda content is lowered down to the levels shown in line B of the figure where for a reaction slurry with 16 moles of $SiO_2$ for each $Al_2O_3$, the $Na_2O$: $Al_2O_3$ ratio will be about 5.0 and for a reaction slurry with 9 moles of $SiO_2$ for each $Al_2O_3$, the $Na_2O$: $Al_2O_3$ ratio be about 2.4. Using this starting composition, NaY faujasites are obtained having a 5.8–6.0 $SiO_2$ to $Al_2O_3$ ratio. Thus line B is based on at least the following points for ratios in the synthesis slurry

| $SiO_2$:$Al_2O_3$ Ratio | $Na_2O$:$Al_2O_3$ Ratio |
|---|---|
| 16:1 | 5.0 |
| 9:1 | 2.4 |

When adding the materials to the reactor, care must be taken that gels are not formed which are subsequently difficult to disperse or dissolve. When adding the materials sequentially a preferred order is to first add diluted sodium silicate, to next slowly add the dilute acid with stirring, to then slowly add the dilute sodium aluminate with continued stirring and finally to add the seeds. Another preferred method to speed up the addition of the reactants is to feed the reactants in three streams to a high speed mixer which forms a soft gel that can be directly fed to the crystallizing reactor. One stream contains sodium silicate and seeds, the second stream is a dilute acid stream and the third stream is a dilute sodium aluminate stream.

In another embodiment after an initial heating of the reactant mixture, the liquid volume of the slurry can be reduced by decanting so that the ensuing crystallization carried out for a relatively long period of time can be done with a significantly reduced reactant volume such as a 2/3 reduction in volume due to the removal of the extra liquid. The period of initial heating can vary from a relatively short time such as about 15 minutes to longer periods such as a day. Since the reaction is carried out in all aqueous system, the mixture can be heated to temperatures of about 100° C. without the need for pressurized equipment.

Using a reaction slurry which has a ratio of 16 $SiO_2$ to 1 $Al_2O_3$, sodium Y type faujasites are obtained with $SiO_2/Al_2O_3$ ratios in the range of about 5.4 to about 6.0 depending on the reduced amount of active soda present. Using a reaction slurry which has a ratio of 9 $SiO_2$ to 1 $Al_2O_3$, sodium Y type faujasites are obtained with $SiO_2/Al_2O_3$ ratios in the range of about 5.3 to about 5.8 depending on the reduced amount of active soda present.

The HSAY zeolite, like conventional NaY type zeolites, may be ion exchanged with solutions of rare earth salts or salts of other metals or ammonium ion salts or combinations thereof to reduce the $Na^+$ ion level in the zeolite to make a thermally and hydrothermally stable promoter for catalyst for treating petroleum fractions. Such ion exchange may be carried out by contacting the HSAY which has a % $Na_2O$ content as synthesized of about 10–15% with a water solution of any salt mentioned above for one minute to 100 hours at temperatures of 0° C. to 100° C., filtering the mass and washing the filter cake of zeolite. Repeated exchanges with or without calcination of the exchanged zeolite may be done to reduce the $Na^+$ ion content of the exchanged zeolite to as low as 0.1–5% $Na_2O$ depending upon the use to be made of the ion exchanged HSAY promoter. These ion exchange procedures are well-known to those in this art. Alternatively the ion exchanging can be done after the HSAY promoter has been made into a catalyst.

The high silica Y-zeolites made by this process are believed to be unique and this is characterized by their high degree of crystallinity as measured by the sharpness index of their NMR spectra to be discussed below and by the absence of occluded silica. As the $SiO_2/Al_2O_3$ ratio increases there is a change in the nature of the chemical bonding involved. S. Ramdas et al. in their paper "Ordering of Aluminum and Silicon in Synthetic Faujasites", Nature, Vol. 292, July 16, 1981, at pages 228–230, report that zeolites may have five types of bonding of silicon to silicon or aluminum. These five types of bonding are expressed in a notation which gives the number of aluminum atoms to which the silicon is bonded through oxygen atoms. Each silicon is bonded to four oxygen atoms which in turn are each bonded to silicon or aluminum. The five types of bonding are Si(4 Al), Si(3 Al), Si(2 Al), Si(1 Al), and Si(0 Al).

Thus, when silicon is bonded through the four oxygen atoms to four aluminum atoms, the notation is Si(4 Al). See also Klinowski et al. "A Re-examination of Si,Al Ordering in Zeolites NaX and NaY" in J. Chem. Soc., Faraday Trans. 2, 78, 1025–1050 (1982).

The Ramdas et al. authors identified the five types of bonding by the use of nuclear magnetic resonance. In Table 1 below is the distribution of the five types of bonds for a conventional NaY having a $SiO_2/Al_2O_3$ ratio of 4.8 and the theoretical distribution for a HSAY-type material with a $SiO_2/Al_2O_3$ ratio of 6.0. For comparison, the table also lists the idealized possible bonding for NaX type faujasite.

TABLE 1

| | Type of Faujasite | | |
|---|---|---|---|
| | NaX | NaY | HSAY |
| $SiO_2/Al_2O_3$ Ratio | 2.4 | 4.8 | 6.0 |
| Bonding Distribution (Idealized) | | | |
| Si(4 Al) | 16 | 0 | 0 |
| Si(3 Al) | 8 | 4 | 0 |
| Si(2 Al) | 0 | 16 | 16 |
| Si(1 Al) | 0 | 12 | 16 |
| Si(0 Al) | 2 | 2 | 4 |

The HSAY type material when made according to the present invention has more Si(1 Al) and Si(0 Al) bonds than conventional NaY zeolite less Si(3 Al) bonds.

Figure 3:
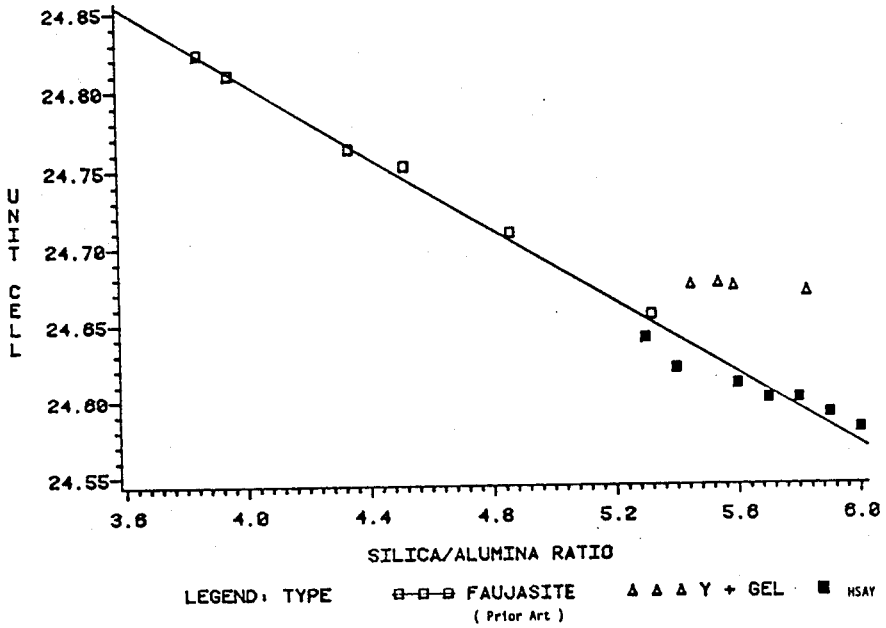
FIG. 3 is a graph of $SiO_2/Al_2O_3$ ratio versus unit cell length for high silica to alumina ratio faujasite type NaY.

To measure these 5 types of bonding experimentally, a high resolution $^{29}Si$ NMR spectra is obtained as illustrated in FIG. 3 of the Ramdas et al. article and a computer-simulated curve is generated based on Gaussian peak shapes. The area under the curves represents the relative populations of the five possible ordering modes.

This new analytical technique has also been used to determine the actual $SiO_2/Al_2O_3$ ratio in the crystal lattice, to identify occluded silica if present, and to determine how well crystallized is the sample. The technique uses Nuclear Magnetic Resonance (NMR) spectra of silicon-29 which is an isotope of silicon present to the extent of 4.7% of all the silicon atoms. The spectra are obtained a 79.45 MHz using magic angle spinning (MAS) which is a technique that greatly improves the resolution of the NMR spectra. Two samples of HSAY labelled A and B made by the present invention and a commercial sample of NaY made by the process taught by U.S. Pat. No. 3,639,099 were studied by this NMR technique using MAS. Sample A was made by the process similar to the one set forth in Example 15 infra and Sample B was made by the process similar to the one set forth in Example 5. The NMR results showed the HSAY has a $SiO_2/Al_2O_3$ ratio in the lattice of 5.6±0.4, that it had no occluded silica, and that it was very well crystallized. For the purposes of this case, the $SiO_2/Al_2O_3$ ratio will be determined by the conventional wet chemical method. The ratio as determined by NMR data has been given because that value is strictly in terms of the amounts of silica and alumina in the crystalline structure. If there is any occluded silica present, it will not be included in the ratio determined by NMR. However, the NMR data is less precise as seen by the greater uncertainity for the values as reported in Table 2.

Figure 2:
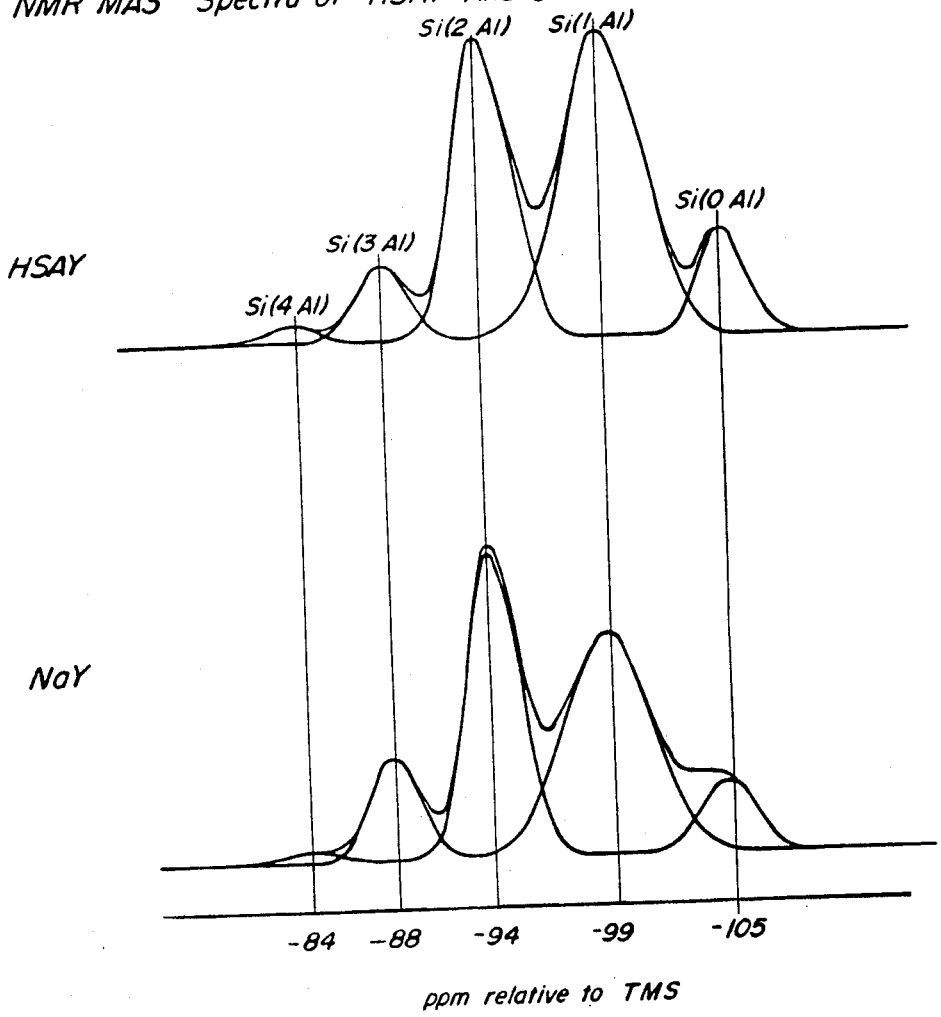
FIG. 2 is the deconvoluted MAS NMR spectra for the high silica Y zeolite according to the present invention and for commercial NaY.

The MAS spectra were obtained at 79.45 MHz and referenced to tetramethyl silane using external HMDS (hexamethyl disiloxane) reference standard and assuming δHMDS = +6.7 p.p.m. with respect to TMS (tetramethylsilane). The spectra show five peaks characteristic of the five possible environments possible for tetrahedral framework silicon in zeolite structures as indicated on the spectra shown in FIG. 2. The scale in FIG. 2 is relative to TMS with the peak for TMS occuring at zero.

The spectra were deconvoluted into the separate components assuming that these were gaussian in nature. The complete assignment of the spectrum is given in Table 2 below together with the peak areas corrected for the small differential effects of sideband corrections. These small differences in the shift values in the Table, compared to those on the spectrum, are due to the overlap between the peaks. The areas of each peak were adjusted so that the sum of the areas of the five peaks equalled 100. The width, w, of each peak at ½ peak height was also calculated. The Si[1 Al] and [0 Al] peaks of the HSAY sample in FIG. 2 are sharper than the comparable peaks of the commercial NaY. This sharpness can be defined mathematically as follows. If the area of the Si[2 Al] peak of each Y sample is used as a reference, a dimensionless sharpness factor, S, for each peak is defined as $$S = \frac{\text{peak area}}{(\text{width at } \tfrac{1}{2} \text{ height})^2} = \frac{A}{w^2}$$

Then the sharpness index, S.I., of each peak other than the Si[2 Al] peak can be defined as $$S.I. = \frac{10\, S_{Si[n\ Al]}}{S_{Si[2\ Al]}}$$

These values for n=0 and 1 are set forth in Table 2 below.

TABLE 2

| | Commercial Sample | HSAY A | HSAY B |
|---|---|---|---|
| $SiO_2/Al_2O_3$ Ratio | | | |
| By NMR | 5.2 ± 0.4 | 5.6 ± 0.4 | 6.0 ±0.4 |
| By Chemical Analysis | 5.0 ± 0.1 | 5.9 ± 0.1 | 6.0 ± 0.1 |
| Peak Types | | | |
| Si(2 Al) | | | |
| Area, A | 36.0 | 34.5 | 33.7 |
| Width, w, at ½ Height | 3.1 | 3.35 | 3.2 |
| Sharpness, $A/w^2$ | 3.75 | 3.07 | 3.29 |
| Si(1 Al) | | | |
| Area, A | 42.4 | 47.5 | 47.1 |
| Width, w, at ½ Height | 5.1 | 4.6 | 4.0 |
| Sharpness, $A/w^2$ | 1.63 | 2.24 | 2.94 |
| Sharpness Index* | 4.3 | 7.3 | 8.9 |
| Si(0 Al) | | | |
| Area, A | 9.0 | 9.3 | 13.6 |
| Width, w, at ½ Height | 3.6 | 2.8 | 4.0 |
| Sharpness, $A/w^2$ | 0.69 | 1.19 | 0.85 |
| Sharpness Index* | 1.8 | 3.9 | 2.6 |

*Sharpness Index = Sharpness of Si(1 Al) or Si(0 Al) peak × 10/sharpness of Si(2 Al) peak.

The data in Table 2 shows that the HSAY Si[1 Al] and Si[0 Al] peaks are much sharper than the same peaks of commercial NaY. The Si [1 Al] peak has a sharpness index, S.I., of at least 6 and preferably at least 7 while the Si [0 Al] peak has a S.I. of about 2.2 and preferably at least 2.5. This sharpness of the [1 Al] and Si[0 Al] peaks or the present $SiO_2/Al_2O_3$ ratio of the HSAY crystal lattice and the high degree of crystallinity of the HSAY.

As discussed above the magic angle NMR spectra can indicate if occluded silica is present since there will be a characteristic, separate peak for silica which is characterized by silicon atoms that are only bonded to oxygen atoms where the oxygen atoms are not further bonded to any other atoms than silicon.

The presence of occluded silica can also be determined from unit cell length data. E. Dempsey et al., in the Journal of Physical Chemistry, 73 (2), 387–390, (1969) compared the chemical analysis versus the unit cell length of various samples of NaX and NaY faujasite. They found that the lowest unit cell length among their samples of NaY was 24.66 A for a NaY which has a $SiO_2/Al_2O_3$ of 5.32 by cnemical analysis. However, their plot of unit cell length versus number of aluminum atoms per unit cell (FIG. 1 in their paper) shows the lowest number of aluminu per unit cell is 53, corresponding to cell size or unit cell length of 24.665A where A is Angstrom units. Although they examined several other NaY samples where the chemical analysis indicated ratios of up to 5.83, none of the NaY samples had a unit cell smaller in length than 24.665A. Therefore they suggest the high $SiO_2/Al_2O_3$ ratio samples contain amorphous silica.

If a NaY sample contains amorphous silica intimately mixed with the crystalline NaY, the apparent ratio by bulk chemical analysis will be higher than the actual ratio in the crystalline lattice. Their data, taken from their Table 1, has been plotted in FIG. 3 as unit cell size versus $SiO_2/Al_2O_3$ ratio. The open squares in FIG. 3 show their data for well-crystallized samples of NaY; the unit cell length is inversely proportional to the $SiO_2/Al_2O_3$ ratio. The triangles in FIG. 3 demonstrate that the NaY samples which had a high ratio by chemical analysis do not show a progressive cell length shrinkage with increasing ratio; these samples plotted as triangles probably contain occluded, amorphous silica. For these high ratio samples the cell length remains at 24.66–24.67A even though the ratio increases from 5.4 to 5.8. One concludes that the highest ratio in the crystalline lattice of the NaY samples which they studied was about 5.3. The solid squares in FIG. 3 are a plot of unit cell length versus $SiO_2/Al_3O_3$ ratio for high silica/alumina ratio faujasite type NaY of the present invention. The solid squares appear to be generally an extension of the open squares and demonstrate that HSAY samples of the present invention have a unit cell length proportional to the $SiO_2/Al_2O_3$ ratio obtained by chemical analysis. The solid squares continue down to a unit cell length of 24.58A corresponding to a ratio of 6.0. Therefore the HSAY samples of the present invention not contain occluded, amorphous silica intimately mixed with the faujasite. Moreover, the ratio obtained by chemical analysis of each sample is indeed the actual $SiO_2/Al_2O_3$ ratio in the crystal lattice.

The unique high silica Y-zeolites made by the present invention with its high degree of crystallinity and absence of occluded silica is very useful as a catalyst material. These catalysts can be made using procedures set forth in the prior art. The HSAY is ion exchanged to lower the alkali metal content and to add stabilizing, catalytically active ions. Typically, the HSAY is exchanged with rare earth ions and/or ammonium and hydrogen ions. The HSAY may be ion exchanged either before or subsequent to inclusion in an inorganic oxide matrix. Furthermore, the ion exchanged HSAY may be calcined, i.e. heated at temperatures from about 200°; to 700° C. either prior to or after inclusion in a catalyst matrix. Preferably, the HSAY, when employed as a hydrocarbon cracking catalyst, will possess alkali metal content, usually expressed as soda content, $Na_2O$, of below about 6 percent by weight.

Conversion of the HSAY zeolite into usuable particulate catalyst is achieved by dispersing the finely divided HSAY zeolite into an inorganic oxide matrix. The inorganic oxide matrix may comprise or include silica-alumina, alumina, silica sols or hydrogels, in combination with additives such as clay, preferably kaolin, and other zeolites, such as ZSM type zeolites.

The catalyst compositions may be prepared in accordance with the teachings of U.S. Pat. No. 3,957,689 which comprises combining a finely divided zeolite and clay with an aqueous slurry which is spray dried and ion exchanged to obtain a highly active hydrocarbon conversion catalyst. Furthermore, the catalyst preparation method may be as generally shown in Canadian 967,136 which involves combining zeolite and clay with an acid alumina sol binder. When it is desired to obtain a catalyst which contains a silica alumina hydrogel binder, the processing methods of U.S. Pat. No. 3,912,619 may be utilized.

As indicated above, the HSAY zeolite is particularly resistant to hydrothermal deactivation conditions normally encountered during regeneration of cracking catalysts. Regeneration involves high temperature oxidation (burning) to remove accumulated carbon deposits at temperatures up to about 1000° C. Furthermore, it is found that the catalysts contain the HSAY described herein are particularly resistant to the deactivation effects of contaminant metals such as nickel and vanadium which are rapidly deposited on the catalyst during the cracking of residual type hydrocarbons.

While the precise reason is not fully understood why the HSAY of the present invention and catalysts containing the HSAY described herein are particularly active and stable, it is thought that this particularly high degree of catalytic activity and stability after steam deactivation and in the presence of contaminant metals is due to its unique structure as discussed by S. Ramdas, et al. in their paper "Ordering Of Aluminum And Silicon In Synthetic Faujasites", Nature, Vol. 292, July 16, 1981, pages 228–230.

During use, the catalytic cracking catalysts of the present invention are combined with a hydrocarbon feedstock which may typically comprise residual type petroleum hydrocarbon fractions that contain up to about 1,000 parts per million nickel and vanadium and up to about 10 weight percent sulfur, weight percent nitrogen. The cracking reaction is normally conducted at a temperature ranging from about 200° to 600° C. using a catalyst to oil ratio on the order of 1 to 30. During the cracking reaction the catalyst typically accumulates from about 0.5 to 10 percent carbon, which is then oxidized during regeneration of the catalyst. It is found that these catalysts are capable of sustaining degrees of activity, even after accumulating up to about 4 percent contaminating metals.

The catalysts may be advantageously combined with additional additives or components such as platinum, which enhances the CO/SOx characteristics of the catalyst. Preferably, platinum is included in the overall catalyst composition in amounts of from about 2 to 10 parts per million. Furthermore, the catalysts may be advantageously combined with SOx gettering components such as lanthanum/alumina composites that contain on the order of about 20 percent by weight lanthanum oxide.

Having described the basic aspects of our invention, the following examples are given to illustrate specific embodiments thereof.

Example 1

This example illustrates the preparation of nucleation center seeds, as disclosed in the McDaniel a U.S. Pat. No. 3,808,326.

A solution of 919 g. of sodium hydroxide in 2,000 ml. water was heated to dissolve 156 g. alumina trihydrate ($al_2O_3.3H_2O$) and the solution was then cooled to room temperature and designated solution A. A second solution B was prepared by mixing 3,126 g. of 4.2° Bé sodium silicate (weight ratio 1.0 $Na_2O$: 3.22 $SiO_2$) into 1,555 ml. water. Then solution A was mixed into solution B with rapid stirring. The mixture was aged at room temperature for about 24 hours and then the slurry of nucleation centers or seeds was ready for use.

Examples 2–5

These examples illustrate the of the high silica/alumina sodium Y type faujasite where the seeded slurry has a silica/alumina ratio of 16:1.

The reactant solutions were prepared as follows. A diluted acid solution was prepared by adding the various amounts of concentrated sulfuric acid having a specific gravity of 1.84 as listed in Table 1 to 100 ml. water and the mixture stirred well.

A dilute sodium aluminate solution was prepared by adding 91 g. of sodium aluminate solution containing 17.2% $Na_2O$ by weight and 21.8% $Al_2O_3$ by weight to 214 g. water.

A diluted sodium silicate solution was prepared by pouring 648 g. of 41.2° Bé sodium silicate solution having a ratio of 1.0 $Na_2O$:3.22 $SiO_2$ in a 40 ounce blender cup of a Hamilton Beach Blender and adding 200 ml. water and the water was thoroughly mixed with the sodium silicate in the blender. While the blender was mixing, the diluted acid was added to the diluted silicate and followed by the addition of the diluted aluminate. Finally, 47 grams of seeds slurry was added to the mixture.

The slurry was poured into polypropylene bottles and capped loosely. The bottles were heated in a water bath until the slurry reached a temperature of 85° C. at which time the bottles were transferred to an oven heated to 100° C. Samples of the slurry were taken from time to time by stirring the contents well and removin 50 of the slurry. The samples were filtered and washed to a pH of 10–10.5 and dried in an oven at 100° C.

The percent crystallinity of each sample by powder X-ray diffraction techniques was compared to a well crystallized, commercial sample of NaY faujasite. The nitrogen surface area of the sample was measured, after the sample was degassed at 1000° F. for one hour, by the chromatographic method on a Perkin-Elmer-Shell 2,12D Sorptometer or by the BET method on an Aminco Adsorptomat.

The unit cell size of the cubic unit cell of HSAY in which all three axes have equal length (a=b=c) was measured as follows. Approximately one gram of HSAY powder which had been equilibrated in a dessicator overnight in a 33% relative humidity atmosphere was mixed with about one of silicon metal powder. The silicon served as an internal standard for an X-ray powder diffraction pattern made using copper radiation filtered through nickel foil. The diffraction pattern was recorded from about 52°2$\theta$ to 60°2$\theta$. The position in degrees 2$\theta$ of the reflection from 997 plane (h=9, k=9, and l=7) and from the 999 plane was measured. The first appeared at about 54.0°–54.2°2$\theta$ and the second at about 58.7°–58.9°2$\theta$. The silicon internal standard has a reflection at 56.12°2$\theta$ theoretically. The measured 2$\theta$ for the two HSAY planes was corrected by the amount that the silicon peak varied from 56.12°. Then the unit cell was calculated using the Bragg's Law equation:

$$a = \frac{\lambda}{2}\sqrt{\frac{h^2 + k^2 + l^2}{\sin\theta}}$$

where $\lambda$ is the copper $K_\alpha$ radiation wavelength of 1.54718 A. The unit cell was the average of the a from the 997 plane and from the 999 plane.

The resulting Nar type faujasite products, described in Table 3 below, which were crystallized from the slurries of Examples 2–5 had a high $SiO_2$–$Al_2O_3$ ratio and especially in Examples 4 and 5.

TABLE 3

Synthesis of High Silica-Alumina Ratio NaY Faujasite from "16 $SiO_2$:1.0 $Al_2O_3$" Seeded Slurries

| Example No. | Moles $Na_2O$:1.0 $Al_2O_3$ | Conc. Sulfuric Acid g. | Hours at 100 ± 1° C. | % Crystallinity | Nitrogen Surface Area, $m^2/g$ | $SiO_2/Al_2O_3$ Ratio by Chemical Analysis | Unit Cell Size, Å |
|---|---|---|---|---|---|---|---|
| 2 | 5.6 | 16.7 | 36 | 104 | 854 | 5.4 | 24.61 |
| 3 | 5.4 | 20.9 | 40 | 102 | 838 | 5.7 | 24.60 |
| 4 | 5.2 | 24.9 | 64 | 97 | 853 | 5.9 | 24.59 |
| 5 | 5.0 | 29.1 | 108 | 99 | 802 | 6.0 | 24.58 |

Examples 6–9

These examples illustrate the production of the high silica/alumina sodium Y type faujasite where the seeded slurry has a silica/alumina ratio of 9:1.

The sodium silicate and sodium aluminate solutions had the same concentrations as in Examples 2–5. The sodium silicate and ½ of the water were blended in the 40 ounce blender cup of a Hamilton Beach blender. The seeds prepared according to Example 1 were added in the amounts listed in Table 4 and blended. The sodium aluminate solution was mixed with the other ½ of the water. The mixture became very viscous, to the point that the mixture gels, and the blender was turned off. The gel was carefully and completely scraped out of the blender cup, transferred to the bowl of a Hobart kitchen mixer. After turning on the Hobart mixer the remainder of the sodium aluminate solution was slowly added. Then the aluminum sulfate (alum) solution which had 7.8% $Al_2O_3$ was slowly added while mixing was continued. The thick, pasty gel was put into 250 ml. or 500 ml.

polypropylene bottles and capped loosely. The remaining heating and analysis procedure was the same as Examples 2-5. The resulting Nar type faujasite products, described in Table 4 and 5 were crystallized from the slurries of Examples 6-9, and they had a high $SiO_2/Al_2O_3$ ratio, especially Examples 8 and 9.

TABLE 4

Synthesis of High Silica-Alumina Ratio NaY Faujasite from "9 $SiO_2$:1.0 $Al_2O_3$" Seeded Slurries

| Example No. | Moles $Na_2O$:1.0 $Al_2O_3$ | Seeds g. | Sodium Aluminate Soln. g. | Water g. | Sodium Silicate g. | $Al_2(SO_4)_3$ Soln. g. |
|---|---|---|---|---|---|---|
| 6 | 3.0 | 194 | 140 | 235 | 860 | 230 |
| 7 | 2.8 | 194 | 129 | 220 | 860 | 260 |
| 8 | 2.6 | 175 | 106 | 184 | 774 | 262 |
| 9 | 2.4 | 175 | 96 | 169 | 774 | 289 |

TABLE 5

Synthesis of High Silica-Alumina Ratio NaY Faujasite from "9 $SiO_2$:1.0 $Al_2O_3$" Seeded Slurries Reactant Time and Product Analyses

| Example No. | Hours at 100 ± 1° C. | % Crystallinity | Nitrogen Surface Area $m.^2/g.$ | $SiO_2/Al_2O_3$ Ratio by Chemical Analysis | Unit Cell Size, a |
|---|---|---|---|---|---|
| 6 | 12 | 108 | 859 | 5.3 | 24.64 |
| 7 | 20 | 109 | 884 | 5.4 | 24.62 |
| 8 | 36 | 104 | 910 | 5.6 | 24.61 |
| 9 | 60 | 103 | 897 | 5.8 | 24.60 |

Example 10

This example illustrates the synthesis using a reduced volume of slurry after an initial heated reaction so that the crystallization step which is carried out for a relatively long period of time can be done with a significant reduction in the volume required.

A 16:1 silica to alumina slurry was prepared having a composition according to Example 5. The slurry was heated in a bottle without stirring for 24 hours at 100° C. During this period tne solids settled to the bottom of the bottle. After the 24-hour heating period the mother liquor was decanted off so there was about ⅔ reduction in volume. The remaining solids surrounded by mother liquor were then heated at 100° C. for 131 hours to obtain a good product having a surface area of 897 $m^2/g.$, a crystallinity of 94% with a unit cell s:ze of 24.59 Angstrom units. This corresponds to a $SiO_2/Al_2O_3$ ratio of 5.9. as seen in Table 3.

Example 11

This example illustrates the production of the Y zeolite using a reduced volume of slurry with a shorter period of initial heating.

A procedure similar to that used in Example 10 was followed except that instead of heating the slurry for 24 hours at 100° C. it was only heated at 100° C. for 15 minutes. The solids were filtered on a Buchner filter. The solids were then returned to the bottle and only enough mother liquor was added to just cover the solids. Since these solids were fluffier than those produced in Example 10, a greater amount of liquor was required. The volume reduction was about 55-60% which is slightly less than the volume reduction in Example 10.

After crystallizing the mixture at 100° C. for 144 hours the product had 107% crystallinity, the unit cell a dimension was 24.61 Angstrom units and the wet chemical analysis of the $SiO_2/Al_2O_3$ was 5.8.

This example also shows obtaining a good product at reduced crystallization volumes with the recovery of excess mother liquor which can be recycled or used for other purposes.

Example 12

This example also illustrates the synthesis using a reduced volume of slurry with a slightly longer initial period of heating.

In this example the exact procedure of Example 11 was followed except that instead of initially heating the slurry at 100° C. for 15 minutes, it was heated for 1 hour. The solids were filtered as in the procedure of Example 11 and just enough mother liquor was added to cover the solids. After heating at 100° C. for 93 hours the percent crystallinity was 109%, the unit cell a dimension was 24.60, and the $SiO_2/Al_2O_3$ ratio by wet chemical analysis was 5.8.

Example 13

This example illustrates the use of alum gelled mother liquor, AGML, to supply some of the silica and alumina reactant materials when using a slurry with a 16:1 silica/alumina ratio.

From a previous production of a sodium Y zeolite made by the process according to the McDaniel et al. U.S. Pat. No. 3,639,099, the typical filtrate of mother liquor filtered off from the fully crystallized NaY batch contains:

4.9% $SiO_2$ and 4.0% $Na_2O$.

Aluminum sulfate (alum) solution is added and the silica alumina gel, AGML, precipitates and is recovered by filtration. The gel contains:

12.6% $SiO_2$
3.4% $Na_2O$
2.8% $Al_2O_3$
2.6% $SO_3$, and
balance water

A slurry for the synthesis of a high silica faujasite according to the present invention was made by mixing in a blender 300 grams AGML with 200 grams water and 517 grams sodium silicate solution (41.2° Bé containing silica and soda in the ratio of 3.22 $SiO_2$:1.0 $Na_2O$). Then 54 grams of sodium aluminate solution (18.2% $Na_2O$; 21.4% $Al_2O_3$) which was diluted with 185 grams water was added and mixed well. Finally 47 grams of a seed slurry as made in Example 1 was mixed in the blender. The effective slurry ratio was 5.2 $Na_2O$: 1.0 $Al_2O_3$:16 $SiO_2$:280 $H_2O$.

The completely mixed slurry was put into a 1.0 liter polypropylene bottle which was placed into an oven at 100°±1° C. After 61 hours the slurry made a well crystallized NaY faujasite, of the high silica type according to the present invention, having a nitrogen surface area of 952 $m^2/g$. This was measured on a Digisorb instrument manufactured by Micromeritics Inc., Norcross, Ga. The HSAY faujasite had the following chemical analysis 10.7% $Na_2O$: 19.8% $Al_2O_3$: 69.5% $SiO_2$ with a $SiO_2/Al_2O_3$ ratio=6.0 and a crystallinity of 102%.

This is an efficient use of a waste stream.

Example 14

This example illustrates the use of alum gelled mother liquor to supply some of the silica and alumina reactant materials when using a slurry with a 9:1 silica/alumina ratio.

1,080 grams of AGML made as described in Example 13 was put into the bowl of a mixer and 319 grams 41.2° Bé silicate was added and mixed in the mixer. Then 69 grams of sodium aluminate solution was slowly added and mixed. The slurry became stiff, but softened after mixing for 1-2 minutes. Finally, 93 grams of seed slurry made according to Example 1, were added. The slurry was transferred to a 1.0 liter polypropylene bottle and heated in an oven at 100°±1° C. The effective slurry oxide ratio was 2.4 $Na_2O$: 1.0 $Al_2O_3$: 9 $SiO_2$: 140 $H_2O$.

After 44 hours a high silica Y faujasite crystallized which had a nitrogen surface area of 937 $m^2/g$ and a good crystallinity which measured as 101% when compared to a commercial NaY standard. Chemical analysis of the composition on a dry basis was as follows:

10.9% $Na_2O$: 20.4% $Al_2O_3$: 68.7% $SiO_2$

The $SiO_2/Al_2O_3$ ratio was 5.7.

Example 15

This example demonstrates the scale-up of the process to a 15 gallon batch which yields nearly 6.0 kg. of dry product.

40.0 kg. of commercial sodium silicate (Philadelphia Quartz "N" Brand, 40.8 Bé gravity) was placed into a mixing tank and diluted with 11.5 kg. water. The mixer was turned on and kept on throughout the addition of chemicals. A solution of 1,531 grams concentrated sulfuric (gravity 1.84) diluted with 11.4 kg. water was very slowly added over a 15 minute period. Mixing was continued for ½ hour more.

Then a diluted solution of sodium aluminate made from 5,226 grams concentrated sodium aluminate solution (18.2% $Na_2O$; 21.4% $Al_2O_3$) mixed with 5.9 kg. water was slowly added over a ½ hour.

Finally, 2,631 grams seeds or nucleation centers (described in Example 1) was added. The slurry was pumped to a 20 gallon steam-jacketed reaction tank and heated to 100°±1° C. to crystallize the NaY. The slurry was sampled from time to time to monitor the progress of the crystallization. After 105 hours at temperature the run was stopped. The slurry was filtered and the filter cake washed free of excess mother liquor.

The product was a well crystallized HSAY with a $SiO_2/Al_2O_3$ ratio of 6.0 and a crystallinity of 96%.

Example 16

This example demonstrates both scale-up to a 15 gallon slurry batch and the use of another type of sodium silicate. The mixing and crystallizaton procedures were the same as in Example 13.

Mixed together were 41.5 kg. Diamond Shamrock DS 34 sodium silicate (25.6% $SiO_2$; 6.6% $Na_2O$) and 14.6 kg. water. A solution of 696 grams concentrated sulfuric acid diluted with 4.5 kg. water was added. The 5,253 grams of sodium aluminate of the same concentration as in Example 13 diluted with 4.5 kg. water was added. Lastly, 2,192 grams seeds were added of the type described in Example 1.

The crystallization at 100°±1° C. yielded HSAY with a $SiO_2/Al_2O_3$ ratio of 5.8 and a crystallinity of 104% in 72 hours.

Example 17

This example illustrates the production of a large batch using the simultaneous addition of the reactants.

Three solutions were prepared. In a first tank was added 36.7 kg. of 41.0° Bé sodium silicate, 12.2 kg. water and 2,633 g. of seeds of the type described in Example 1. The materials were mixed and heated to 60° C.

In a second tank a dilute acid solution was prepared by mixing 1,537 g. of concentrated sulfuric acid with 9,100 g. water.

In a third tank a dilute sodium aluminate solution was prepared by mixing 5,232 g. of sodium aluminate (18.2% $Na_2O$ and 21.4% $Al_2O_3$) with 6,800 g. water.

The three tanks were connected by lines to a reactor having a high speed mixing pump and the line from the first tank was opened first. After the three streams were mixed by the high speed mixing pump they formed a soft gel which was fed to a reactor with further stirring. The reactor was closed and the gel was heated gradually to 100° C. while stirring continued. After the 100° C. temperature was reached, the stirrer was turned off and the mixture was maintained at this temperature for 70-80 hours to crystallize the HSAY. The slurry was then quenched with cold water and filtered with subsequent washings with hot water. The material was dried and yielded 6 kg. of well-crystallized HSAY having a $SiO_2/Al_2O_3$ ratio of 5.9 and a percent crystallinity as 103%. The unit cell size was 24.60 Angstrom units and the nitrogen surface area measured by the BET method using a Micromeritics Digisorb was 875 $m.^2/g$. The chemical analysis was 11.0% $Na_2O$, 19.6% $Al_2O_3$ and 68.4% $SiO_2$.

Example 18

HSAY zeolite was rare earth exchanged and calcined to obtain a "CREHSAY" that comprised 14.0 percent $RE_2O_3$, 2.45 percent $Na_2O$ and a silica to a lumin ratio of 5.9:1.0 by the following procedure.

A 4,444 g portion of HSAY filter cake (45% solids) obtained in Example 17 was slurried in 9 l of deionized water. The HSAY slurry was then blended into a solution of 4,444 ml commercial mixed rare earth chloride solution (61% $RECl_3.6H_2O$ by weight) diluted with 7.5 l of deionized water. The resulting mixture was heated to 90° C.-100° C. and held at that temperature for one hour. The slurry was filtered and the filter cake was washed twice with 3 l of boiling deionized water. The washed filter cake was slurried into a solution of 4,444 ml commercial rare earth solution diluted with 16.5 liters of deionized water. The mixture was again heated to 90°-100° C. and held at temperature for one hour. Then the slurry was filtered and resulting filter cake was washed three times with 3 l of boiling deionized water. The filter cake was then oven dried at 150° C. for 4-8 hours. Finally, the dried zeolite was calcined at 538° C. for three hours. The product CREHSAY had the following properties:

| | |
|---|---|
| Loss on Ignition (LOI) | 2.1 wt. % |
| $RE_2O_3$ | 14.0 wt. % |
| $Na_2O$ | 2.5 wt. % |
| Ratio $SiO_2/Al_2O_3$ | 5.9 ± 0.1 |
| Nitrogen Surface Area | 768 $m^2/gm$ |

-continued

| (by BET method) | | |
|---|---|---|

Example 19

(a) The CREHSAY of Example 18 was used to prepare a FCC catalyst according to the teachings of U.S. Pat. No. 3,957,689. An acid-alum-silica sol was made by mixing two solutions A and B through a high speed mixer. Solution A was 11.5 kg of 12.5% $SiO_2$ sodium silicate ($Na_2O$: 3.2 $SiO_2$). Solution B was 3.60 l of a solution made from 20 weight percent sulfuric acid (2.2 l) and dilute aluminum sulfate solution, 77 g $Al_2O_3$ per liter (1.4 liters). The ratio of the flows of solutions A and B through the mixer is approximately 1.5 l solution A to 0.5 l solution B. The ratio of the flows is adjusted to produce an acid-alum-silica sol having a pH of 2.9–3.2. To 14.4 kg of acid-alum-silica sol is added a slurry composed of 2,860 g kaolin clay and 2,145 g CREHSAY from Example 18 mixed into 6 l water. The mixture of the acid-alum-silica sol and the slurry of CREHASY and kaolin in water was blended and spray dried using an inlet temperature of 316° C. and an outlet temperature of 149° C. A 3,000 g portion of the spray dried product was slurried in 11.3 l of water at 60°–71° C. and filtered. The filter cake was washed three times with 3 l of 3 percent ammonium sulfate solution. Then the cake was reslurried in 9 l of hot water, filtered, and, finally, rinsed three times with 3 l of hot water. The catalyst was then oven dried at 149° C.

(b) A catalyst having the same proportions of ingredients was made in the same manner from calcined rare earth exchanged conventional NaY having a silica to alumina ratio of about 4.9±0.1

The results of comparison tests are shown below in Table 6. The microactivity test used a modification of the test procedure published by F. G. Ciapetta and D. S. Henderson entitled "Microactivity Test For Cracking Catalysts", Oil And Gas Journal, Vol. 65, pages 88–93, Oct. 16, 1967. Microactivity tests are routinely used in the petroleum industry to evaluate cracking catalysts in the laboratory. The petroleum fraction which was cracked over these catalysts was a West Texas Heavy Gas Oil (WTHGO) using the following test conditions:

Temperature 499° C.;

Weight Hourly Space Velocity (WHSV) 16;

Catalyst to oil ratio 3.

The WTHGO (1.67 g) is passed through 5.0 g of catalyst in 1.3 minutes. The products are collected and the percent conversion of gas oil into hydrogen, light gases, gasolene range hydrocarbons, etc. are determined by gas chromatography.

The catalysts were impregnated with Ni and V as naphthenates dissolved in WTHGO; next the hydrocarbons were burned off by slowly raising the temperature to 677° C. Then the metals impregnated catalysts were steam deactivated by the S-13.5 procedure before testing for cracking microactivity.

TABLE 6

| Catalyst Composition (wt. %) | Example 19(b) | Example 19(a) |
|---|---|---|
| Zeolite | 35 | 35 |
| $SiO_2$ | 24 | 24 |
| Clay | 41 | 41 |
| $Na_2O$ | 0.49 | 0.37 |
| $RE_2O_3$ | 4.94 | 5.08 |
| $Al_2O_3$ | 26.5 | 26.0 |

TABLE 6-continued

| Microactivity (Vol. % Conv.) After Indicated Deactivation | | |
|---|---|---|
| S-13.5[1] | | |
| 0% Metals | 82 | 86 |
| 1% (Ni + V)[2] | 53 | 74 |
| 1500[3] | 81 | 80 |
| 1550[4] | 20 | 64 |
| Partial Chemical Analysis of Zeolite | CREY | HSACREY |
| $SiO_2/Al_2O_3$ (Ratio) | 4.9 ± 0.1 | 5.8 ± 0.1 |
| $RE_2O_3$ (Wt. %) | 15.0 ± 1 | 14.0 ± 1 |
| $Na_2O$ (Wt. %) | 3.2 ± 0.2 | 2.4 ± 0.2 |

[1]Steam deactivation: 8 hours at 732° C., 100% steam at 1.1 kg/cm² gauge pressure.

[2]$Ni = \frac{V}{2}$

[3]Steam deactivation: 5 hours at 816° C., 100% steam at 0 kg/cm² gauge pressure.

[4]Steam deactivation: 5 hours at 843° C., 100% steam at 0 kg/cm² gauge pressure.

Example 20

(a) A slurry was made from 2,576 g HSAY filter cake (45% solids) from a batch of HSAY synthesized as in Example 17 and 4,186 g of kaolin in 8.0 l of water. This slurry was thoroughly blended with 13.8 kg of acid-alum-silica sol, the preparation of which was described in Example 19. The mixture was spray dried using the conditions described in Example 19. The then spray dried material was washed with water and ion exchanged with mixed rare earth chloride solution as follows: A 3,000 g portion of spray dried material was slurried in 11.3 l of hot deionized water at 60°–71° C. and filtered. The filter cake was rinsed three times with 3 l of hot water. Then the cake was reslurried in 9 l of hot water and filtered again. The cake was rinsed three times with 3 l portions of hot water. The filter cake was next reslurried in 10 l of hot water and 215 ml of mixed rare earth chloride solution (60 wt. % $RECl_3.6H_2O$) were mixed into the slurry. The slurry was gently stirred for 20 minutes and kept at a temperature of 60°–71° C., and the pH was kept at 4.7–5.2. Lastly the slurry was filtered again and rinsed with three 3 l portions of hot water.

(b) A similar catalyst was prepared using a conventional NaY zeolite that has a $SiO_2/Al_2O_3$ ratio of about 4.9±0.1

The finished catalyst was then oven dried at 149° C. The finished catalyst made from HSAY was compared in the tests given below in Table 7 with the catalyst made in a similar manner from conventional NaY. West Texas Heavy Gas Oil was cracked in the microactivity test using the test conditions given in Example 19.

TABLE 7

| | Example 20(b) | Example 20(a) |
|---|---|---|
| Catalyst Composition (wt. %) | | |
| Zeolite | 17 | 17 |
| $SiO_2$ | 23 | 23 |
| Clay | 60 | 60 |
| $Na_2O$ | 0.74 | 0.70 |
| $RE_2O_3$ | 3.68 | 3.83 |
| $SiO_2/Al_2O_3$ ratio of zeolite | 4.9 ± 0.1 | 5.8 ± 0.1 |
| Microactivity (Vol. % Conv.) | | |
| S-13.5 Deactivation | | |
| As Is | 73 | 82 |
| 0% Metals | 68 | 72 |
| 0.5% (Ni + V) | 28 | 54 |
| 1500 Deactivation[1] | 48 | 62 |

[1]Steam deactivation: 5 hours at 816° C., 100% steam at 0 kg/cm² gauge pressure For each of the catalysts described above in Examples 19 and 20 the catalyst made with the HSAY type zeolite demonstrates better resistance to hydrothermal deactivation than the same formulation of catalyst made with an equal amount of conventional Y type zeolite. The two catalysts in Examples 19 and 20 made with HSAY also show greater resistance to deactivation by vanadium and nickel contamination (heavy metals poisoning) than the equivalent catalysts made from conventional Y type zeolite.

The above catalyst examples clearly indicate that valuable cracking catalysts may be obtained using the HSAY according to the present invention.

It is understood that the foregoing detailed description is given merely by way of illustration and that many variations may be made therein without departing from the spirit of the invention.

What is claimed is:

1. A process of producing zeolite Y having a formula in terms of moles of oxides as $$0.9\pm0.2\ Na_2O:\ Al_2O_3:\ wSiO_2:\ xH_2O$$

where w is a value greater than 5.0 and x may have a value of up to about 9, comprising (a) forming a reaction slurry by mixing a source of alumina other than metakaolin or kaolin;

a source of silica selected from the group consisting of sodium silicate, silica gel, silicic acid and mixtures thereof;

a source of soda;

a source of seeds or nucleation centers; and a further reactant which is either (I) a controller of active soda selected from the group consisting of an acid, a solution of a salt obtained from aluminum and an acid, and mixtures thereof;

(II) a combination source of reactive silica and alumina which is low in active soda; or (III) a mixture of (I) and (II);

sources and said further reactant being selected to control the active soda concentration in the reaction slurry, as measured by the ratio of active moles of $Na_2O$ to one mole of $Al_2O_3$, below the value given by line A in FIG. 1 for the corresponding ratio of moles of silica to one mole of alumina in the reaction slurry, said line A being based on at least the following points for ratios in the synthesis slurry

| $SiO_2:Al_2O_3$ Ratio | $Na_2O:Al_2O_3$ Ratio |
|---|---|
| 16:1 | 6.6:1 |
| 9:1 | 3.1:1 |
| 6:1 | 1.8:1 |

and (b) heating the reaction slurry product of step (a) to crystallize zeolite Y.

2. A process of producing zeolite Y according to claim 1, wherein w in the formula has a value of equal to or greater than about 5.8 by maintaining the concentration of the active sodium in the reaction slurry at or below the value given by line B in FIG. 1 for the corresponding ratio of moles of silica to moles of alumina in the reaction slurry, said line B being based on at least the following points for ratios in the synthesis slurry

| $SiO_2:Al_2O_3$ Ratio | $Na_2O:Al_2O_3$ Ratio |
|---|---|
| 16:1 | 5.0 |
| 9:1 | 2.4 |

3. A process according to claim 1, wherein the acid in the controller of active soda is sulfuric acid.

4. A process according to claim 1, wherein the salt obtained from aluminum and an acid in the controller of active soda is aluminum sulfate.

5. A process according to claim 1, wherein the combination source of silica and alumina is an aluminum salt gelled mother liquor.

6. A process according to claim 5, wherein the aluminum salt which gels the mother liquor is selected from the group consisting of aluminum sulfate, aluminum chloride, aluminum nitrate, and mixtures thereof.

7. A process according to claim 6, wherein the aluminum salt is aluminum sulfate.

8. A process according to claim 1, wherein the reaction slurry is heated and the excess mother liquor is decanted before the reaction product is crystallized.

9. A process according to claim 1, wherein the source of alumina, the source of silica, and the controller of active soda are fed by separate streams to a mixer with the source of seeds or nucleation centers added to one of the streams to form the reaction slurry which is then heated in step (b).

10. A process according to claim 9, wherein said separate streams are fed to the mixer simultaneously.

11. The high silica zeolite Y made by the process of claim 1 and having a unit cell size of 24.64 or less.

12. The high silica zeloite Y made by the process of claim 2 and having a unit cell size of 24.64 or less.

13. The high silica zeolite Y made by the process of claim 3 and having a unit cell size of 24.64 or less.

14. The high silica zeolite Y made by the process of claim 4 and having a unit cell size of 24.64 or less.

15. The high silica zeolite Y made by the process of claim 5 and having a unit cell size of 24.64 or less.

16. The high silica zeolite Y made by the process of claim 6 and having a unit cell size of 24.64 or less.

17. The high silica zeolite Y made by the process of claim 7 and having a unit cell size of 24.64 or less.

18. The high silica zeolite Y made by the process of claim 8 and having a unit cell size of 24.64 or less.

19. The high silica zeolite Y made by the process of claim 9 and having a unit cell size of 24.64 or less.

20. The high silica zeolite Y made by the process of claim 10 and having a unit cell size of 24.64 or less.

21. A high silica, well crystallized zeolite Y with little occluded amorphous silica having a formula as crystallized in terms of moles of oxides as $$0.9\pm0.2\ Na_2O:\ Al_2O_3:\ wSiO_2:\ H_2O$$

where w is a value greater than 5.0 in the crystalline lattice of the zeolite Y, x has a value up to about 9, and having a sharpness index, S.I., of at least 6 for the Si[1Al] peak and at least about 2.2 for the Si[0 Al] peak based on the sharpness index formula $$S.I. = \frac{{}^{10}S_{Si[n\ Al]}}{S_{Si[2\ Al]}}$$

where n is 0 or 1 and where the sharpness, S, is defined as $$S = \frac{\text{peak area}}{(\text{width at } \frac{1}{2} \text{ height})^2}$$

where the peak area and width are measured on deconvoluted magic angle spinning nuclear magnetic resonance peak spectra of silicon-29, said zeolite Y having a unit cell size of 24.64 or less and having no impurities from metakaolin or kaolin.

22. A high silica zeolite Y according to claim 21, wherein the sharpness index is at least 7 for the Si[1 Al] peak and at least 2.5 for the Si[0 Al] peak.

23. A high silica zeolite Y according to claim 21, wherein w has a value greater than 5.4.

24. A high silica zeolite Y according to claim 21, wherein w has a value greater than 5.8.

* * * * *